US011601540B2

(12) United States Patent
Durrani

(10) Patent No.: US 11,601,540 B2
(45) Date of Patent: *Mar. 7, 2023

(54) SYSTEM AND METHOD FOR USING A SECONDARY DEVICE TO ACCESS INFORMATION STORED REMOTELY

(71) Applicant: Mobileyme LLC, Orlando, FL (US)

(72) Inventor: Mahira Durrani, Orlando, FL (US)

(73) Assignee: MOBILEYME LLC, Orlando, FL (US)

( * ) Notice: Subject to any disclaimer, the term of this patent is extended or adjusted under 35 U.S.C. 154(b) by 222 days.

This patent is subject to a terminal disclaimer.

(21) Appl. No.: 17/089,857

(22) Filed: Nov. 5, 2020

(65) Prior Publication Data
US 2021/0051225 A1 Feb. 18, 2021

Related U.S. Application Data

(63) Continuation of application No. 16/386,161, filed on Apr. 16, 2019, now Pat. No. 10,868,902.
(Continued)

(51) Int. Cl.
H04M 1/04 (2006.01)
H04M 1/2757 (2020.01)
(Continued)

(52) U.S. Cl.
CPC ........ *H04M 1/2757* (2020.01); *H04L 63/083* (2013.01); *H04L 67/306* (2013.01); *H04M 1/275* (2013.01); *H04M 1/27457* (2020.01)

(58) Field of Classification Search
CPC . G01S 19/16; G05B 9/02; G06F 3/165; G06F 9/451; G06Q 20/382; G06Q 30/0269; G06Q 50/01; H04L 51/04; H04L 43/10; H04L 63/083; H04L 63/102; H04L 63/1441; H04L 67/125; H04L 67/306; H04L 67/52; H04L 9/3226; H04L 41/0893; H04L 63/10; H04L 63/123; H04M 1/04; H04M 1/27457; H04M 1/275;
(Continued)

(56) References Cited

U.S. PATENT DOCUMENTS 7,623,854 B2 * 11/2009 Satoh .................. H04M 1/2746
455/74.1
8,855,601 B2 * 10/2014 Grkov .................... G06F 21/88
455/410

(Continued)

*Primary Examiner* — Gerald Gauthier
(74) *Attorney, Agent, or Firm* — IP Attorneys Group, LLC; David Chen; Jared Vitola

(57) ABSTRACT

A system and method allows for access to the contacts of one person on a second person's device, without affecting the content on the second person's device. The contact information, and other information that is stored on a first person's device, can be temporarily downloaded onto a second person's device for making calls or accessing the other information, thereby allowing for contact with someone. Upon logging out of the system on the second device, the information from the first person is deleted. This allows the first person to contact others when the first person's phone is not available for some reason. The system also allows for the downloading of more content and virtual access to the lost/stolen telephone to be able to locate the phone, control the phone or destroy the information on the phone.

16 Claims, 12 Drawing Sheets

Related U.S. Application Data

(60) Provisional application No. 62/761,980, filed on Apr. 16, 2018.

(51) Int. Cl.
  *H04L 67/306* (2022.01)
  *H04L 9/40* (2022.01)
  *H04M 1/275* (2006.01)
  *H04M 1/27457* (2020.01)

(58) Field of Classification Search
  CPC .. H04M 1/2757; H04M 1/66; H04M 1/72469; H04M 15/7652; H04M 19/08; H04M 1/2746; H04M 1/56; H04W 8/20; H04W 12/065; H04W 12/08; H04W 12/084; H04W 12/37; H04W 64/003; G16H 20/60
  See application file for complete search history.

(56) References Cited

U.S. PATENT DOCUMENTS

| | | | | |
|---|---|---|---|---|
| 9,746,999 | B2* | 8/2017 | Kurihara | H04M 1/72469 |
| 10,417,020 | B2* | 9/2019 | Desai | G06F 9/451 |
| 10,868,902 | B2* | 12/2020 | Durrani | H04L 67/52 |
| 11,032,285 | B2* | 6/2021 | Handler | H04L 9/3226 |
| 2003/0054860 | A1* | 3/2003 | Chen | H04M 1/275 |
| | | | | 455/564 |
| 2003/0104833 | A1* | 6/2003 | Chiu | H04M 1/275 |
| | | | | 455/556.1 |
| 2009/0197579 | A1* | 8/2009 | Celik | H04M 1/72436 |
| | | | | 455/414.1 |
| 2009/0221264 | A1* | 9/2009 | Minami | H04W 12/08 |
| | | | | 455/410 |
| 2010/0138298 | A1* | 6/2010 | Fitzgerald | H04L 63/10 |
| | | | | 705/14.58 |
| 2010/0203874 | A1* | 8/2010 | Scott | H04M 1/56 |
| | | | | 455/566 |
| 2010/0227605 | A1* | 9/2010 | Fournier | H04L 63/123 |
| | | | | 455/419 |
| 2011/0047033 | A1* | 2/2011 | Mahaffey | G06Q 30/0269 |
| | | | | 705/14.66 |
| 2012/0188064 | A1* | 7/2012 | Mahaffey | H04L 63/1441 |
| | | | | 340/384.1 |
| 2012/0196571 | A1* | 8/2012 | Grkov | G06F 3/165 |
| | | | | 455/411 |
| 2012/0216292 | A1* | 8/2012 | Richardson | H04L 43/10 |
| | | | | 726/27 |
| 2013/0237204 | A1* | 9/2013 | Buck | G01S 19/16 |
| | | | | 455/418 |
| 2014/0057608 | A1* | 2/2014 | Hillier | H04M 1/56 |
| | | | | 455/414.1 |
| 2014/0058951 | A1* | 2/2014 | Kuppuswamy | G06Q 20/382 |
| | | | | 705/67 |
| 2014/0245014 | A1* | 8/2014 | Tuck | H04W 12/37 |
| | | | | 455/420 |
| 2014/0274008 | A1* | 9/2014 | Olodort | H04M 19/08 |
| | | | | 455/417 |
| 2015/0042575 | A1* | 2/2015 | Dong | H04W 12/065 |
| | | | | 345/173 |
| 2015/0227116 | A1* | 8/2015 | Ronkainen | G05B 9/02 |
| | | | | 700/86 |
| 2015/0372981 | A1* | 12/2015 | Cohan | H04M 1/66 |
| | | | | 455/410 |
| 2016/0066189 | A1* | 3/2016 | Mahaffey | H04M 15/7652 |
| | | | | 455/405 |
| 2017/0026316 | A1* | 1/2017 | Li | H04L 51/04 |
| 2017/0099386 | A1* | 4/2017 | Weber | H04W 8/20 |
| 2017/0142090 | A1* | 5/2017 | Mahaffey | H04W 12/084 |
| 2018/0206124 | A1* | 7/2018 | Mahaffey | H04L 63/14 |
| 2019/0182678 | A1* | 6/2019 | Kikinis | H04W 64/003 |
| 2019/0279317 | A1* | 9/2019 | Burton | G06Q 50/01 |
| 2019/0279744 | A1* | 9/2019 | Howley | G16H 20/60 |
| 2019/0320052 | A1* | 10/2019 | Durrani | H04L 63/102 |
| 2019/0342759 | A1* | 11/2019 | Mahaffey | G06F 21/88 |
| 2021/0051225 | A1* | 2/2021 | Durrani | H04W 12/08 |
| 2022/0029882 | A1* | 1/2022 | Sarukkai | H04L 41/0893 |

* cited by examiner

SYSTEM AND METHOD FOR USING A SECONDARY DEVICE TO ACCESS INFORMATION STORED REMOTELY

This application is a continuation application of U.S. Non-Provisional patent application Ser. No.: 16/386,161, filed Apr. 16, 2019 and titled "System and Method for Using a Secondary Device to Access Information Stored Remotely," which claims priority to U.S. Provisional Application No.: 62/761,980, filed on Apr. 16, 2018. The contents of the above-identified Applications are relied upon and incorporated herein by reference in their entirety.

FIELD OF THE INVENTION

The present invention relates to a modified formula for making a hydrophilic foam which uses fillers or additives to enhance certain features of the hydrophilic foam. Smart phones are everywhere. People rely on them to communicate with others, search for information, take and store pictures, store music, and store other important information on them. As a result, people rely on them for many of the activities during the day. Depending on use of the smart phone on a particular day, there may not be sufficient power to run the smart phone all day. While the batteries are getting better, there may times that the batteries are not sufficient and the phone "may die." This may be as a result of the amount of use and nowhere to charge them, or the battery may be older and not hold a sufficient charge. Simply, it could be just from spending too much time on the phone. Thus, the smart phone owners may find themselves without an operating phone. This could be an issue if the person needs to make a call (emergency?). Naturally, the owners could borrow someone else's phone to make a call, but that would mean that owner would have to remember the telephone number they wanted to call! With ability to store people's phone numbers and ask the phone to call a person, rarely do people need to remember phone numbers.

Additionally, if an owner needs to replace a phone because it was lost, stolen or broken, then the owner may be without a telephone for a day or more (insurance may need to send the owner a refurbished phone). If the phone is used for business, that may not work.

The system also allows access to one's smart phone when the phone is located somewhere else, e.g., it has been stolen or lost. The contents of the telephone may be accessed from a prior storage session and the phone may be accessed remotely to employ a number of actions. For example, the lost/stolen phone may be accessed (even it is turned off), to send a location or pictures or sounds to help find the phone. The phone may also be remotely locked or deleted. The phone may also have certain functions that are either limited or blocked altogether.

A system has been designed that allows a smart phone user to access the owner's own stored information from another person's telephone or other connected device without any effect to the other person's device.

SUMMARY OF THE INVENTION

The present invention is directed to a method of communicating with a contact person from a secondary communication device that includes the steps of displaying, in response to an inquiry, previously stored contact information that may include contact information about the contact person on the secondary communication device, the secondary communication device not having the previously stored contact information, providing at least one option to communicate with the contact person, initiating the communication with the contact person based on a selection of a communication option, and transmitting the communication to the contact person from the secondary communication device.

In some embodiments, the option provided is based on the previously stored contact information for the contact person.

In some other embodiments, the secondary communication device is one of a computer, a tablet, a telephone, and a kiosk.

In another embodiment, there is a method of controlling a first mobile device through a second mobile device that includes the steps of displaying, in response to an inquiry, at least some previously stored information from the first mobile device, the second mobile device not having the previously stored contact information, providing access to the first mobile device, and controlling the first mobile device in response to input from the second mobile device.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
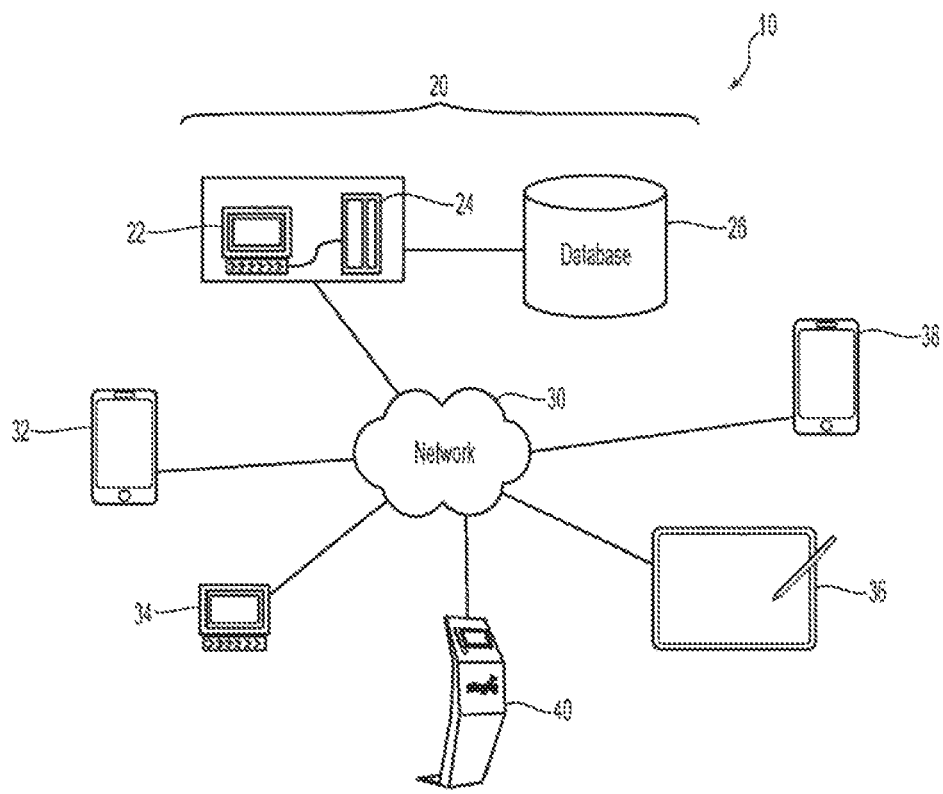
FIG. 1 is a schematic of a system that can be used to implement one embodiment of a method according to the present invention.

The present invention relates to a modified formula for making a hydrophilic foam which used fillers or additives to enhance certain features of the hydrophilic foam. In some embodiments the modified formula makes the hydrophilic foam less absorptive and therefore makes available more of the material which was absorbed by the foam. In other embodiments the modified formula makes the hydrophilic foam easier to clean and reduces the staining propensity of the foam. In other embodiments additives are included to enhance the foam or the experience of using the foam. Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 is a schematic of one embodiment of a system 10 that can be used with the method according to the present invention. As may be understood the system 10 includes a base information technology (IT) structure 20 for the provider. The provider's IT structure 20 further includes a computer 22 connected to a server 24, which is also connected to a database 26. The computer 22 is operated by the provider who is responsible for managing and updating the system. The computer 22 is in turn in communication with the server 24 to provide access to a database 26 and also a network 30. The database 26 includes the data necessary for implementing the method, as discussed in more detail below, as well as other information and data, e.g., contacts and phone information. The server 24 allows communication by and between the computer 22, the database 26, and the network 30. The server 24 (or the computer 22) may also have stored thereon computer programs, applications, downloadable files, etc. There may also be other IT structures that may be similar to the IT structure 20 that can be added.

A plurality of devices, including a telephone, a smart phone of the user 32, a desk top computer 34, a tablet/phone 36, a second phone (generally the secondary communication device) 38, and a kiosk 40 may also be connected to the IT structure 20 through the network 30 as allowed by the provider's computer 22 through the server 24. Any number of computers/tablets/phones 32,34,36,38,40 may be connected to the system 10 through the network 30.

Figure 2:
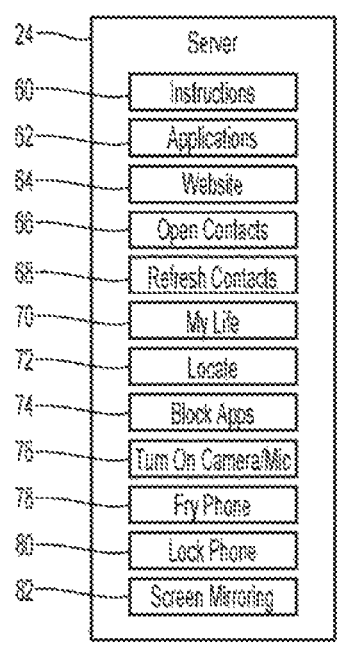
FIG. 2 is a schematic of a server associated with the system.

As illustrated in FIG. 2, the server 24 has stored on it the instructions 60 that are needed to allow for the method of the present application to be implemented. As described below, the server 24 may also have applications 62 and a website that functions as a gateway for the users into the system 10. Once into the system 10, there are a number of areas that the users can access—Open Contacts 66, Refresh Contacts 68, MyLife 70, Locate 72, Block Apps 74, Turn On Camera/Mic 76, Fry Phone 78, Lock Phone 80 and Screen Mirroring 82.

Figure 3:
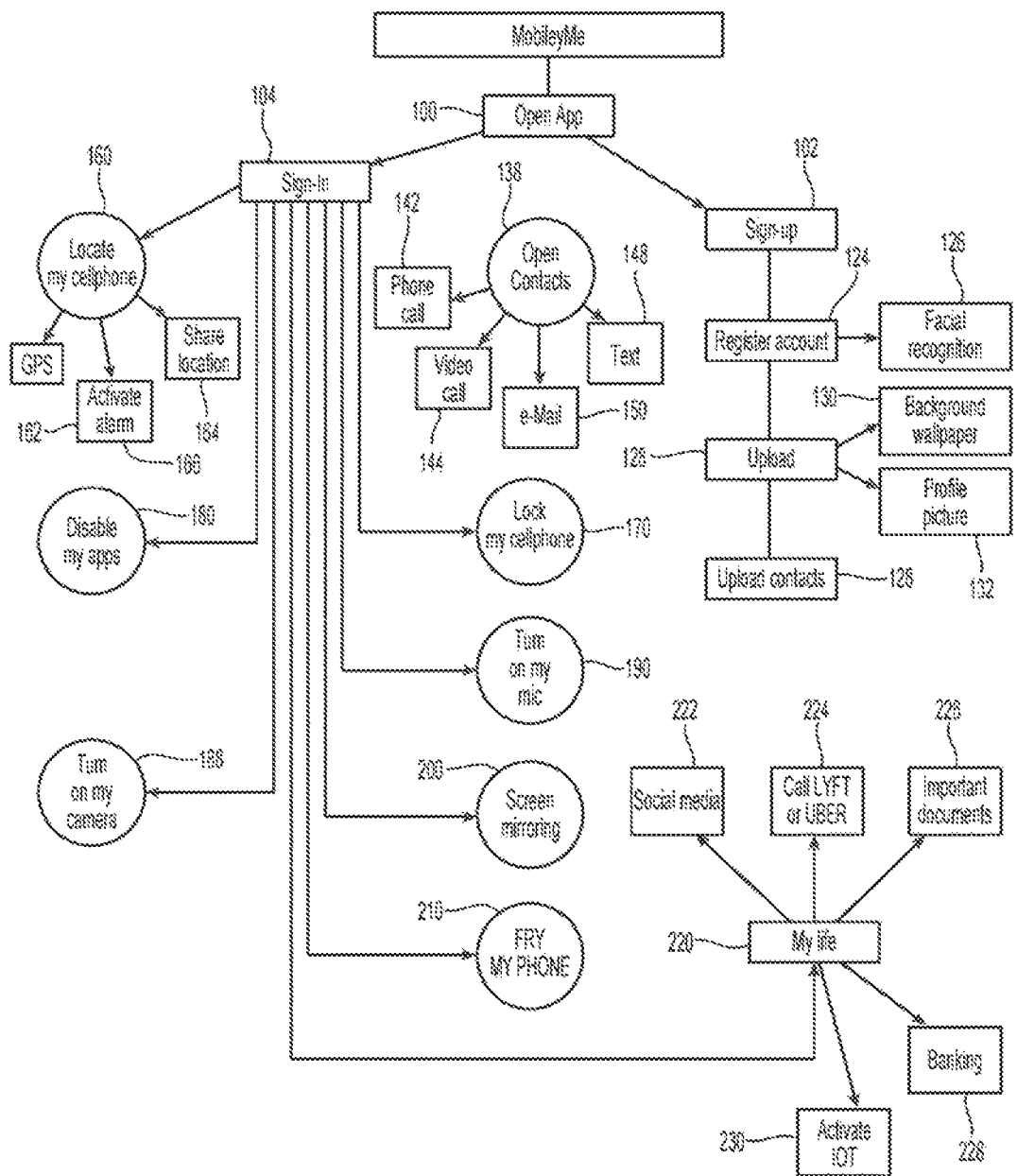
FIG. 3 is a flow chart showing some of the actions available to a user of the system in FIG. 1.
Figure 4:
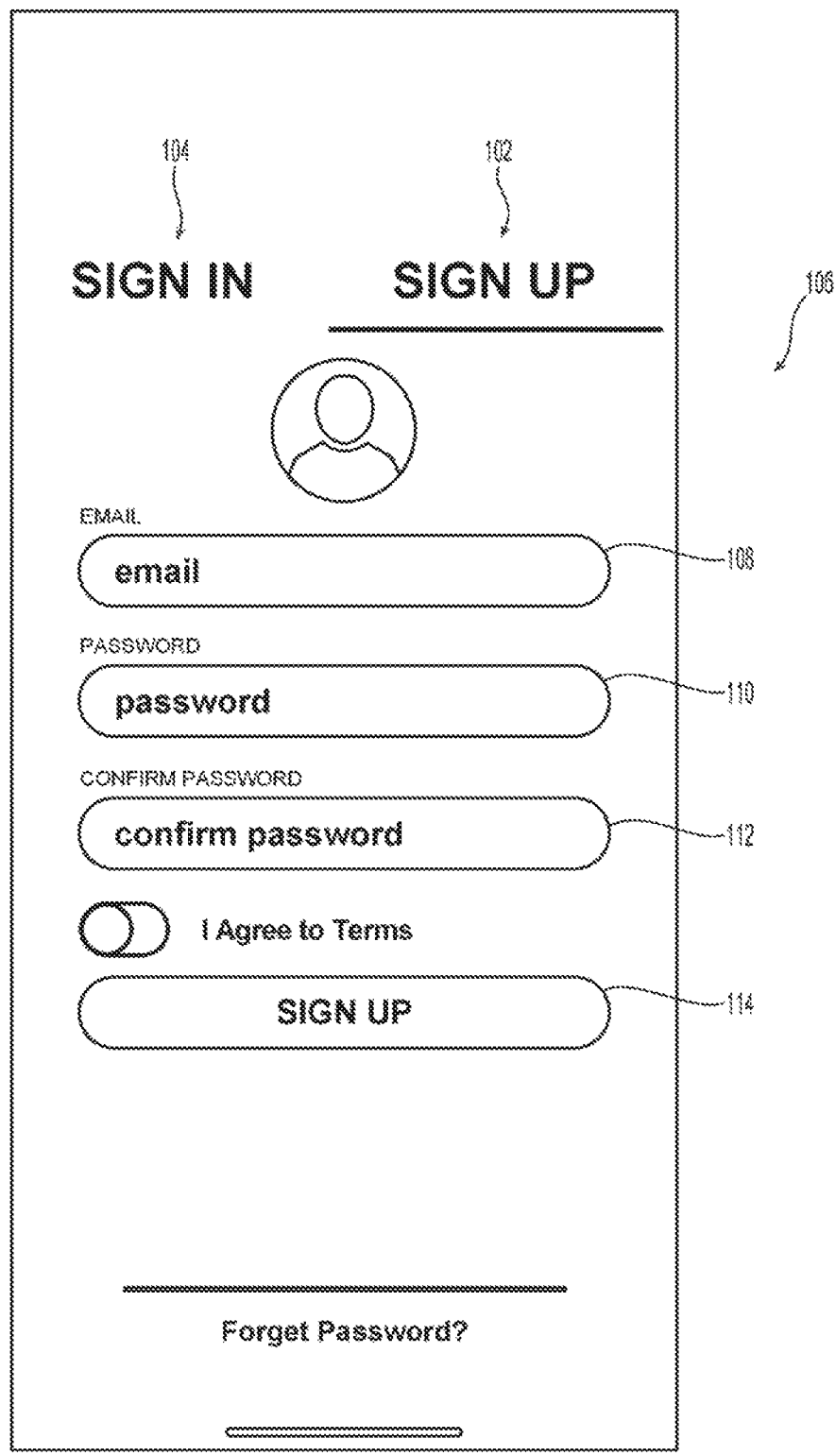
FIG. 4 is an exemplary screenshot of when the application is opened by a user and is going to sign up to use the system.

Turing now to FIG. 3, the details of the system 10 will be explained. To begin using the system, the user accesses the website 64 (or an application store) to download the application for the mobile device 32. Once the application is downloaded to the mobile device 32, the user can open the app at 100. The same options are available at a corresponding website, e.g., 64. The user is then presented with a screen that offers the user two options: sign up with the app 102 or sign in 104 to the app. An exemplary screen 106 is illustrated on a screen of the phone 32 in FIG. 4. If the user is logging in for the first time, then the user selects the signing up feature of the app. The user will input the user's email address in the box 108 and then enter a password in box 110 and reconfirm the password in box 112. After agreeing to terms of use, the user selects the sign up button 114. The system 10 will ask the user for a cell phone number as a verification of the identity of the user. In order to complete the sign-up procedure, the user will have to enter a verification code that is sent to the phone 32.

Figure 5:
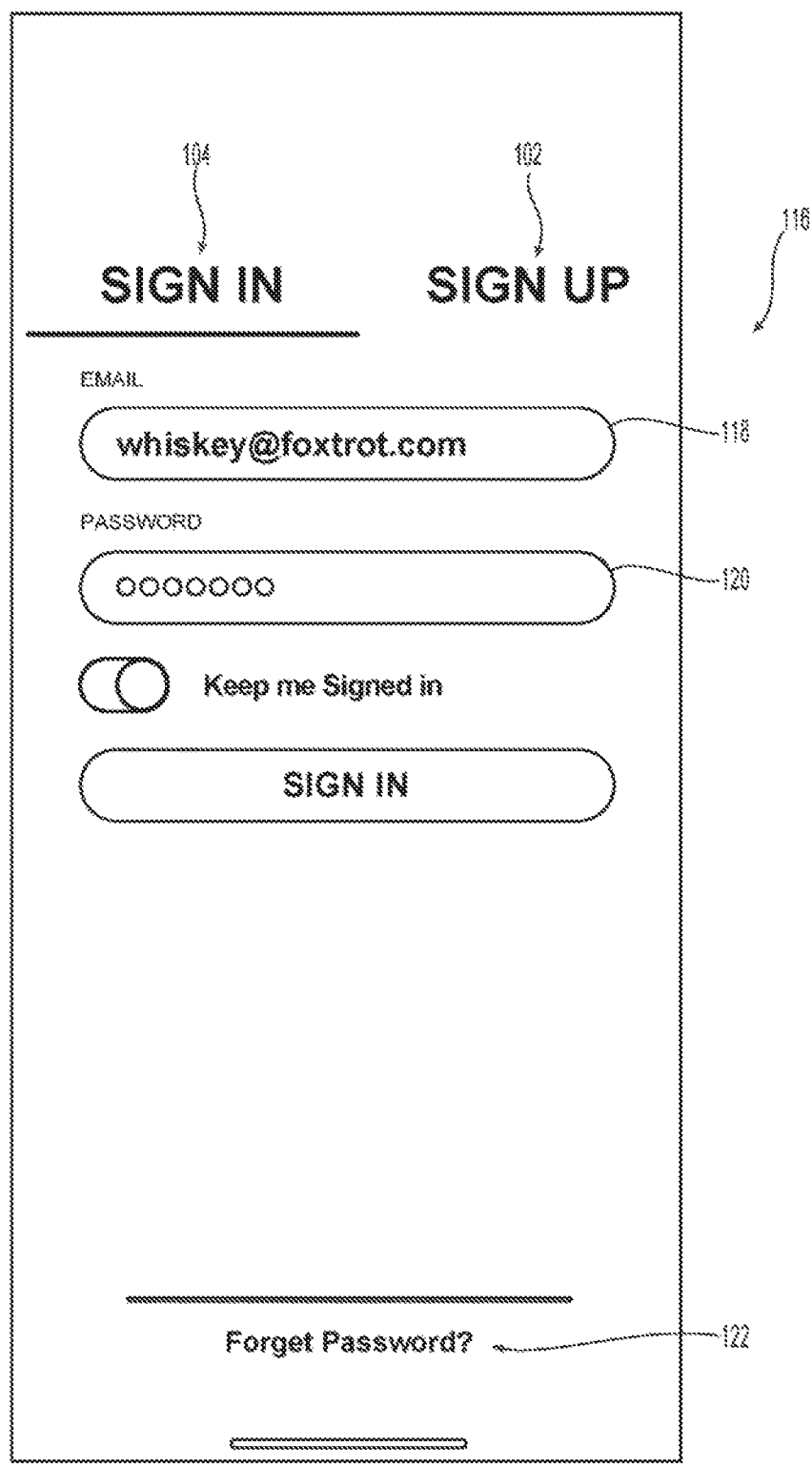
FIG. 5 is an exemplary screenshot of a user signing into the system.

For those users who have already signed up, the user selects the sign in selection 104. An exemplary screen 116 is illustrated on a screen of the phone 32 in FIG. 5. The user's email address used to sign up may be present in the email box 118 and the password is entered in the password box 120. As is typical with apps, a "Forget Password?" link 122 is available on the initial screens for users.

Returning to FIG. 3, once the user has begun the sign-up process by entering an email address and password, the user may register their account 124 and included with that is the possibility of facial recognition at 126. This will allow for faster signing into the app in the future. The user is then prompted at 128 to upload a background image 130 for use on the screens and also a profile picture 132. As described below, the profile picture 132 will be shown to those who receive the calls later.

At 134, the new user is prompted to upload all of the contacts that are on the phone 32. See FIG. 6, where there user is prompted to Save/Update Contacts at button 136. For the new user, the contacts (telephone numbers, email addresses, physical addresses, etc.) on the phone 32 will be uploaded to the system 10 through the network 30 and the server 24 in particular. If the person has already uploaded contacts at least once and has added new contacts to the phone 32, then the system 10 will upload the new contacts that have been added. The system 10 also presents the user with the possibility of accessing or downloading the contacts at button 138. The button 138 is to be used in one of two instances. In the first instance, button 138 will allow access to the user's contacts regardless of the device that the user is using after having signed in. The second instance is when the user has a new phone and needs to download their contacts from the system 10. Or perhaps, the user would like to permanently share their contacts with another person. As noted below, there is a safety feature that prevents the user from accidentally downloading their contacts to someone else's device.

As noted above, the system 10 is particularly useful when the user does not have access to the phone 32, but needs to make contact with one of the contacts. This could happen because the phone 32 has a dead battery, is broken, is lost or misplace, or has been stolen. If the user of phone 32 needs to communicate with one of the contacts, the user would be unable to in this scenario. The user may be able to find a payphone (although the number of payphones in the US are decreasing significantly) or borrow someone else's phone, but the user needs to know what number to call. Given that most smartphones do not require the user to know a person's phone number to communicate with the contacts stored on a phone, most people are not familiar with the phone numbers of their contacts. Thus, having another phone is typically not very helpful if the owner of the other phone does have the contact information needed. Thus, having access to the user's contact information is important.

Figure 7:
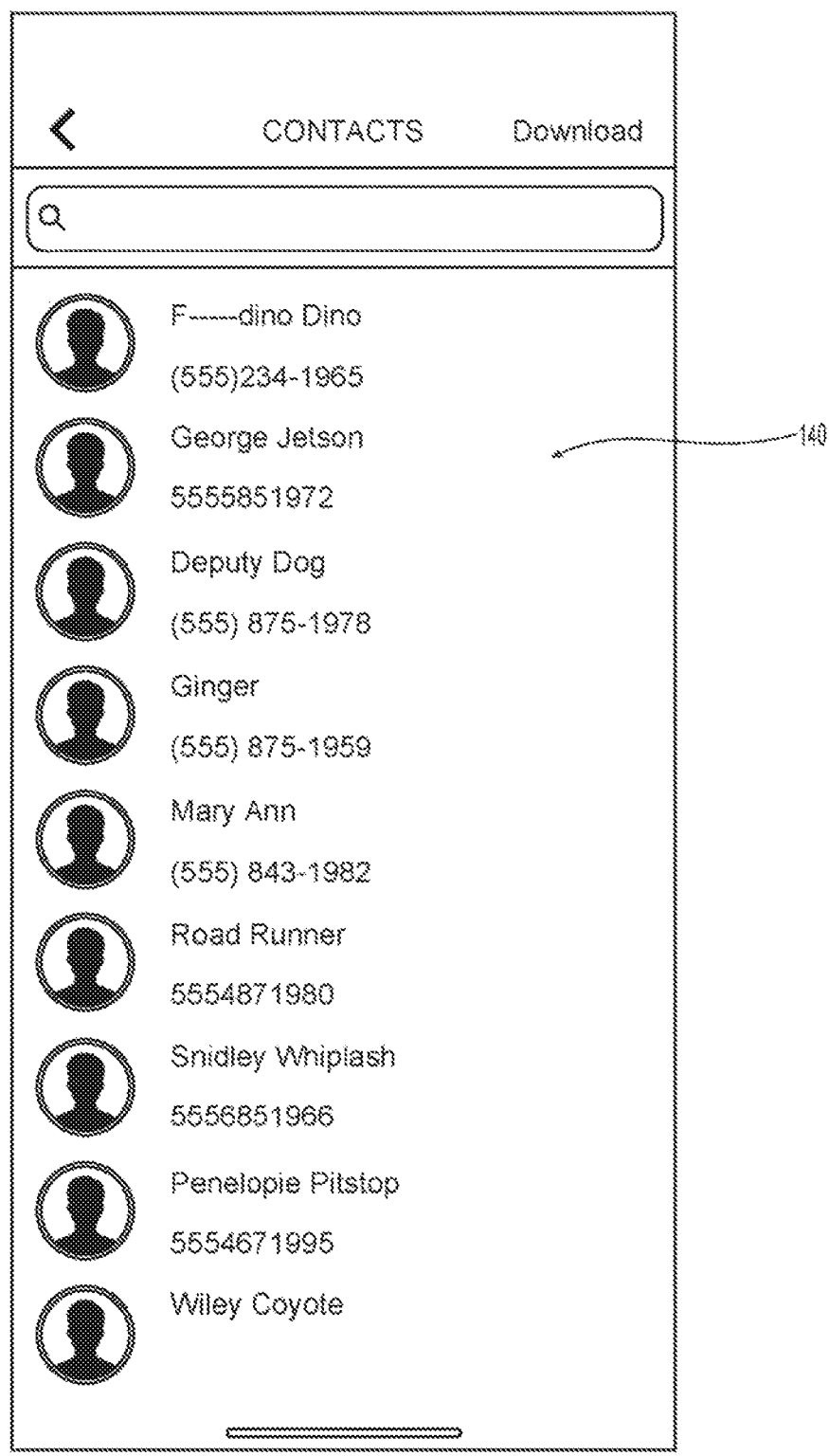
FIG. 7 is an exemplary screenshot of a user's contacts that are available for use by the user
Figure 8:
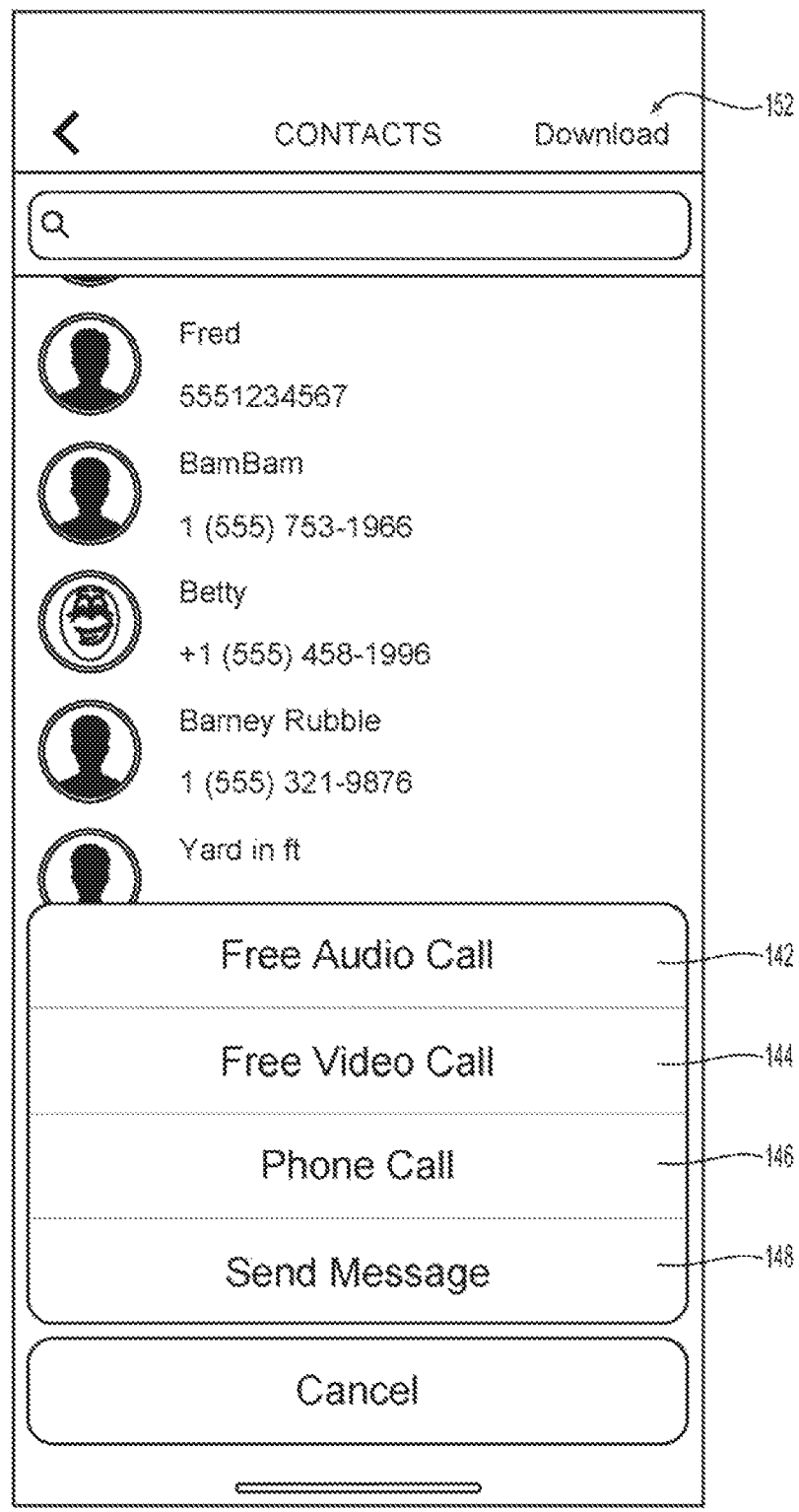
FIG. 8 is an exemplary screenshot of a user's options with the contacts that are available to the user.

The user of the now dead/lost/stolen phone 32 can use another mobile device 34,36,38,40 (computer, another smartphone, tablet, etc.) as a secondary communication device and login to the app controlled by system 10. The user could log-in by first downloading the app to the secondary communication device or login to the website controlled by the system 10. The user would then follow the sign-in 104 button after inputting the email address in box 118 and password in box 120. The user will see the same screen as in FIG. 6, but on the secondary communication device. This time however, the user will select button 138 to access the user's contact information that was previously downloaded to the system 10. A list of contacts 140 will appear on the secondary communication device as illustrated in FIG. 7. All of the contacts are now present on the secondary communication device through the app and the system 10, but are not stored on the secondary communication device. The user can then select one of the persons in the list of contacts 140 to communicate with. Depending on the information that is available for the selected contact, a number of options are presented to the user. If there is a telephone number, the user is presented with a Free Audio Call (button 142) or a Free Video Call (button 144), or make a Phone Call (button 146) or send a text message (button 148) as illustrated in FIG. 8. The phone calls are made through the app and the system 10 and not as a phone call from the secondary communication device. In this case, the calls and text messages are sent over VoIP through the system 10.

Figure 9:
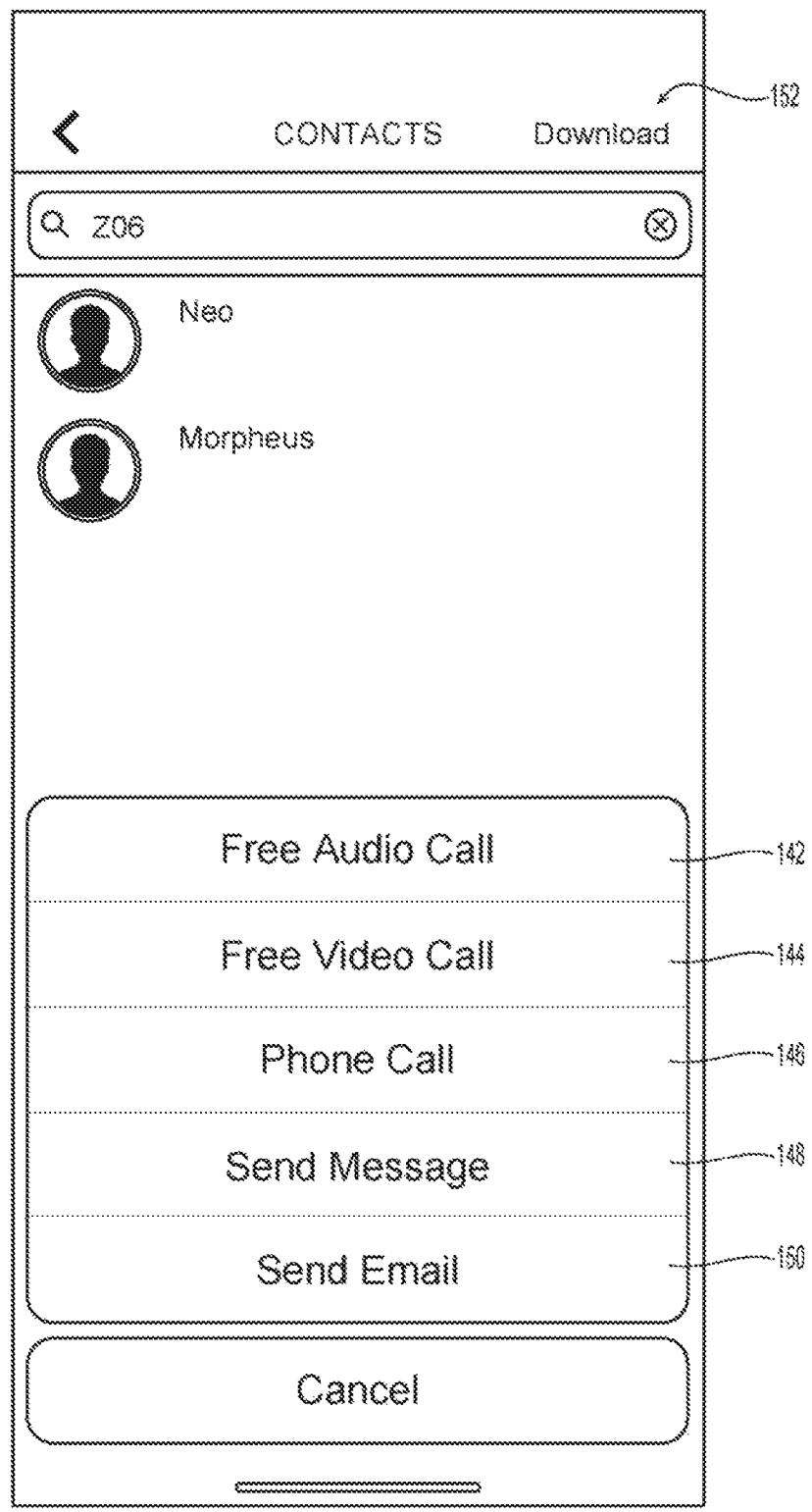
FIG. 9 is an exemplary screenshot of the options available when the email addresses of the contacts are saved with the contact information.

If there is an email address for a user that is selected from the list of contacts 140, the user is also presented with an email message (button 150) in addition to the other methods as illustrated in FIG. 9. The emails are also sent through the app and the system 10 and not from the secondary communication device.

As illustrated in FIG. 1 a kiosk 40 may also be used as the secondary communication device. The kiosk 40 may be positioned in areas where having communication options are a necessity. This would airports, train stations, and other travel hubs, where a person's battery may have died in route and needs to contact the person who is retrieving them from the travel hub. The kiosk 40 would be available for a person to log into the system and use the kiosk 40 as a dedicated secondary communication device. This would prevent a user from having to ask a stranger to use their phone.

Figure 6:
FIG. 6 is an exemplary screenshot of a user having logged into the system and has available choices depending on which device the user is logged into.
Figure 10:
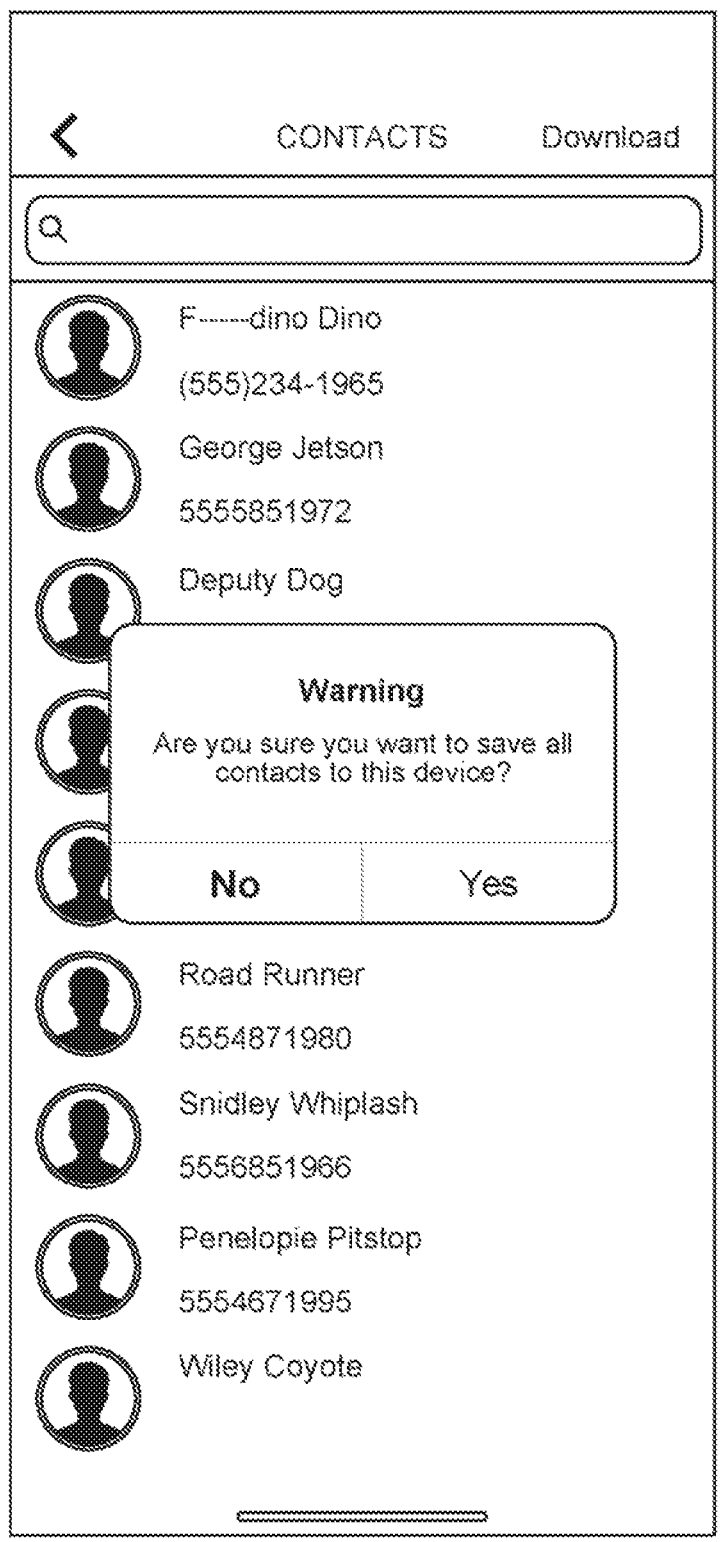
FIG. 10 is an exemplary screenshot of a user downloading the contacts onto a new phone.

As noted before, the user could download the contacts to another device by using the button 138 as illustrated in FIG. 6. As seen above, selecting button 138 provides the list of contacts 140 as illustrated in FIGS. 8 and 9. The list of contacts are present on the secondary communication device but not saved. The user would have to push the Download button 152 on the top right portion of the screen in FIGS. 8 and 9 to save the list of contacts 140 to the secondary communication device (or a replacement phone). If the Download button 152 is selected (either intentionally or by accident), the user has to confirm the saving of the contacts to the device being used as illustrated in FIG. 10. This prevents the unintentional saving of contacts to a mobile device in error.

Figure 11:
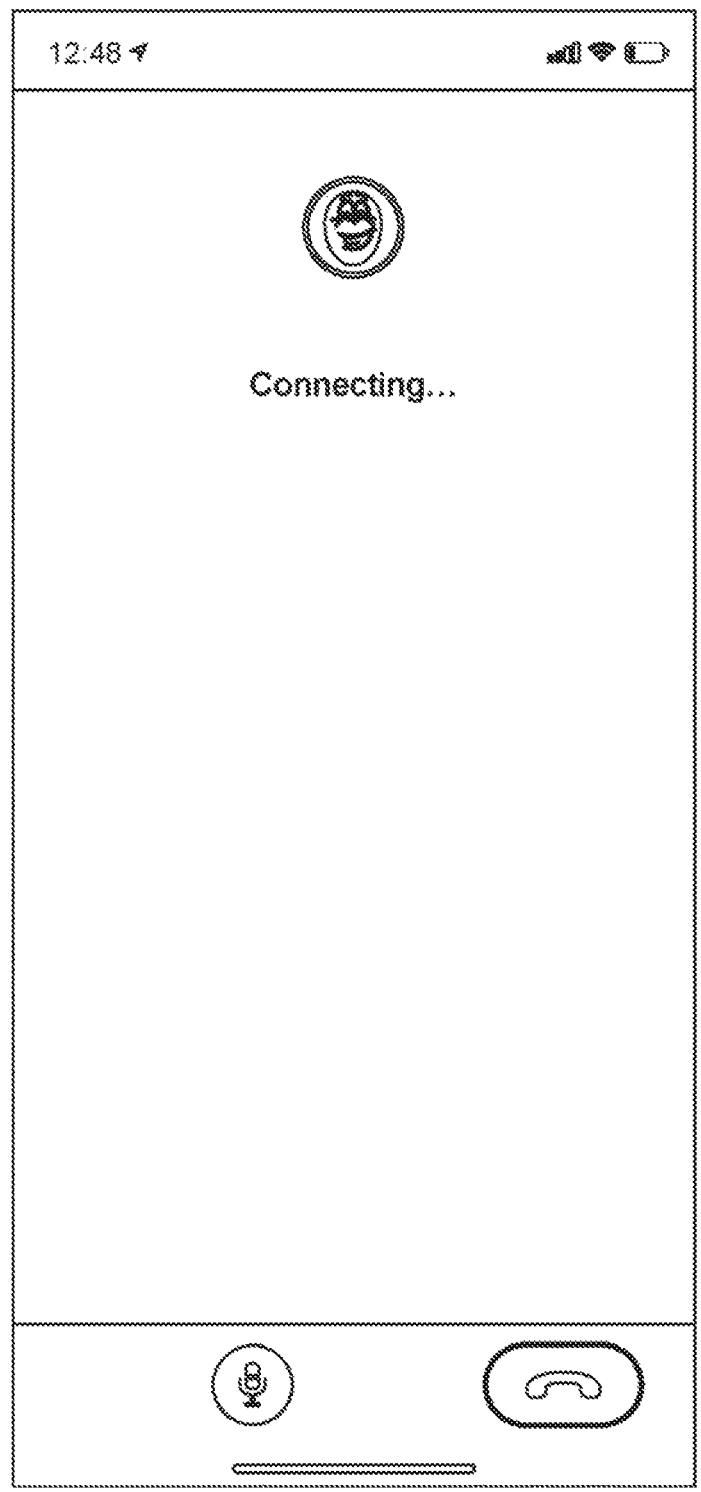
FIG. 11 is an exemplary screenshot of the screen when the call is connecting and show's the user's picture to the person being called.

When the user places a phone call (Free Audio Call (button 142) or a Free Video Call (button 144), or make a Phone Call (button 146)), the secondary communication device will show that the call is being connected as illustrated in FIG. 11. The person being contacted through the secondary communication device will see the user's information as normal and not that of the secondary communication device. This will help to avoid confusion and the possible rejection of the phone call when the person being called does not recognize the caller.

Figure 12:
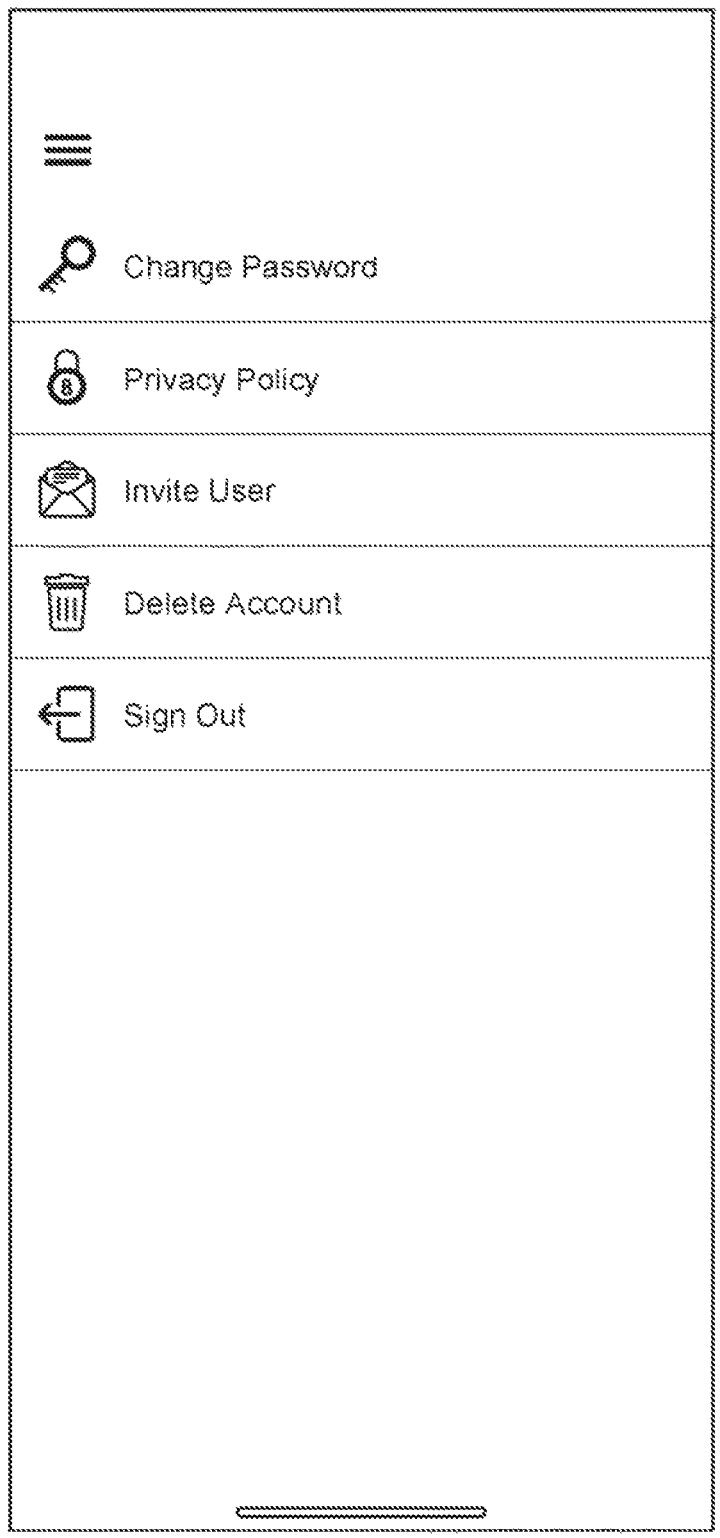
FIG. 12 is an exemplary screenshot of a user choices available to the user after using the system on another device.
Figure 13:
FIG. 13 is an exemplary screenshot after the user has logged out of the other device.

After the phone calls, messages are sent, the secondary communication device will have a screen such as that illustrated in FIG. 12. If the user signs out, then the secondary communication device will return to the opening screen (FIG. 13), where the user can close the app or the website and return the secondary communication device to its owner with no personal information left on the secondary communication device.

The user may also download a virtual image of the user's phone 32 to the system 10. Upon signing in at 104, there are a number of options available to the user. As noted above the Open Contacts 138 is available. That is available to the user when the phone 32 is dead, lost, or stolen.

In the event that the phone 32 is lost or may have been stolen, the user can opening the Locate My cell phone 160 portion of the system. The user can select the GPS portion 162 whereby the system 10 will contact the phone 32 through accessing the native operating system of the phone and it will be able to locate the coordinates of the phone 32 by triangulation of the phone 32 with the cell towers. Alternatively, the system 10 can have the phone 32 share its location by sending a signal back to the system 10 using the phone's share location feature. Finally under this Locate My cell phone selection, the system 10 can, in response to the user making a requested at 166, cause the phone 32 to emit a loud signal or alarm. This would be particularly useful if the user lost the phone recently or misplaced it at an enclosed location (house or office) so that the user would be able to hear the alarm.

Another option available to the user is the Lock My Cell Phone option 170. If the user selects this option, then the system 10 would send a signal to the phone 32 through the native operating system of the phone to lock it, thereby preventing others from being able to access the contents of the phone 32. Again, this would need to be done quickly as most phones are set to lock after a predetermined time. Thus, this option is most useful when that time is relatively long or the phone 32 has not been missing for too long. If the phone has been stolen and the thief has been able to keep the phone from locking, then this option may be of greater benefit.

Disable My Apps 180 is another option that is available. This option closes any applications that are open on the phone 32, preventing someone from accessing data or other information that may be sensitive or preferably not shared with someone. This would be useful if personal apps are used on a business issued phone and the user does not want the boss to have access to the information. The closed apps would need to have a password to be able to reopen them. This is also useful if the phone is stolen, preventing the thief from accessing personal information while still allowing the phone to provide its location through the Locate My Cellphone option 160.

The Turn on My Camera option 188 and the Turn on My Mic option 190 are closely related. The Turn on My Camera option 188 allows the user to see where the phone 32 is located (or perhaps who has the phone). The Turn on My Mic option 190 allows the user to hear, again all through the secondary communication device, the sounds of where the phone is located. It may be possible for the user to identify the location from the pictures or the sound. The images and sounds can be recorded on the phone 32 or the secondary communication device by use of these options.

The screen mirroring option 200 allows the user to see what is being done on the phone 32 from the secondary communication device. Through the secondary communication device, the user will be able to "see" what changes are made to the screen while connected.

A more drastic option is available with the Fry My Phone option 210. This option allows the system in response to the user's request to reset the phone 32 to the factory settings, essentially rendering the phone 32 useless.

A final option, which has a number of sub-options is the MyLife option 220, which allows the user to remotely access and operate other apps and functions on the phone 32. Again, after signing in, the user is able to select MyLife 220, which then provides access to the user's social media feeds 222 (Snapchat, Instagram, Twitter, etc.), car rides and sharing 224, important documents 226 (copies of passport and birth certificates; business documents; etc.), banking apps 228 (WellsFargo, BOA, etc.), and the Internet of Things through any of the home assistants (Echo devices, Google Home, HomePod, etc.)

In each of these areas of MyLife 220, the user will be able to operate each of the options as if the user had the phone 32 in their hand. Naturally, if the phone has been stolen, it would not be advisable to try and use these options without knowing that the phone is safe and secure. If the phone 32 has simply died, then the user could operate these apps and functions with a peace of mind. Again, once the user logs out on the secondary communication device, then the content is erased from the secondary communication device and the user need not worry about the owner of the secondary communication device being able to access the information viewed on that device.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A system for accessing remote information comprising:
    an application;
    a primary device with said application and contact information;
    a secondary device with said application;
    a server;
    a network which connects said primary and secondary devices and said server;
    wherein said server stores said contact information;
    wherein said secondary device uses said application to access said contact information from said server via said network;
    wherein said access by said secondary device is independent of said primary device;
    wherein said secondary device uses said application to communicate with a contact;
    wherein when said secondary device uses said application to communicate with a contact said primary device is able to be in either an active or inactive state;
    wherein said application allows a user to sign in or sign out, and when said user signs out on said secondary device all access to said contact information is ceased.

2. The system for accessing remote information according to claim 1, wherein when said secondary device uses said application to communicate with a contact, said communication is selected from the group consisting of email, audio call, video call, text message, and combinations thereof.

3. The system for accessing remote information according to claim 1, wherein said communication selected from the group consisting of audio call, video call, or text message are completed using VoIP.

4. The system for accessing remote information according to claim 1, wherein said primary device and said secondary device each have a phone number, and wherein when said secondary device uses said application to communicate with a contact, said communication will be received by said contact as said phone number of said primary device.

5. The system for accessing remote information according to claim 1, wherein said primary device is a cellular phone and said secondary device is selected from the group consisting of cellular phone, computer, tablet, kiosk, and combinations thereof.

6. The system for accessing remote information according to claim 1, further comprising a plurality of secondary devices with said application, and wherein a user can use any of said plurality of secondary devices to access said contact information and communicate with a contact.

7. The system for accessing remote information according to claim 6, wherein only one of said plurality of secondary devices can access said primary device at a time.

8. The system for accessing remote information according to claim 1, wherein said application allows a user of said secondary device to store said contact information on said secondary device.

9. The system for accessing remote information according to claim 1, wherein said server additionally stores a virtual image of said primary device which can be accessed and optionally modified by said application on said secondary device.

10. The system for accessing remote information according to claim 1, wherein said primary device further comprises at least one secondary application, and wherein said secondary device uses said application to manage said secondary application.

11. The system for accessing remote information according to claim 10, wherein said managing of said secondary application is independent of said primary device.

12. The system for accessing remote information according to claim 10, wherein a copy of said secondary application is stored on said server.

13. A system for accessing remote information comprising:
    a managing application;
    a primary device with said managing application and at least one secondary application;
    wherein said at least one secondary application comprises information personal to a user of said primary device;
    a secondary device with said managing application;
    a server;
    a network which connects said primary and secondary devices and said server;
    wherein said secondary device uses said managing application to access and optionally modify said at least one secondary application;
    wherein said access and optional modification of said at least one secondary application is independent of said primary device;
    wherein said primary device and said secondary device each have location data, and wherein when said secondary device uses said managing application to access and optionally modify said at least one application function, any location data required by said at least one application function is taken from said secondary device.

14. The system for accessing remote information according to claim 13, wherein said primary device and said secondary device each have identification data, and wherein when said secondary device uses said managing application to access and optionally modify said at least one secondary application, any communication completed by said at least one secondary application will be received using said identification data of said primary device.

15. The system for accessing remote information according to claim 13, wherein said secondary device uses said managing application to further view and optionally modify said information personal to said user.

16. The system for accessing remote information according to claim 13, wherein said application allows said user to sign in or sign out, and when said user signs out on said secondary device all access to said at least one application function is ceased.

* * * * *